Patented June 15, 1937

2,083,883

UNITED STATES PATENT OFFICE 2,083,883

SYNTHETIC RESINOUS MATERIALS AND PROCESS OF PREPARING THE SAME

Hein Israel Waterman, Delft, Netherlands, assignor to Shell Development Company, San Francisco, Calif., a corporation of Delaware No Drawing. Application July 10, 1936, Serial No. 89,999. In the Netherlands July 16, 1935

18 Claims. (Cl. 260—2)

This invention relates to the production of valuable synthetic resins, resinous materials and film-forming substances from hydrocarbon mixtures comprising as an essential ingredient at least one member of the class consisting of unsaturated cyclic hydrocarbons and of naphthenes; more particularly the invention relates to a practical and economical process for the production of useful resinous materials from hydrocarbon mixtures essentially comprising in substantial amount aromatic hydrocarbons and/or naphthenes.

The process of the invention comprises treating a hydrocarbon mixture essentially comprising at least one member of the class consisting of unsaturated cyclic hydrocarbons and of naphthenes with chlorine until the treated mixture contains a substantial amount of chlorinated material, reacting the chlorinated mixture with a non-chlorinated hydrocarbon mixture essentially comprising at least one member of the class consisting of unsaturated cyclic hydrocarbons and of naphthenes in the presence of a suitable condensing catalyst or agent under conditions at which additive reactions occur to form higher molecular weight resinous materials, and recovering the resulting resinous products from the reaction mixture.

The invention further relates to valuable resins, resinous materials and film-forming substances and compositions containing them which may be practically and economically prepared in accordance with the process of the invention. The products, many of which are novel, are useful as raw materials for the manufacture of drying oils, lacquers, varnishes, paints and other coating compositions; they are useful in the manufacture of plastic materials, films, threads, discs, joining materials, binders and the like.

The base materials used in the execution of the invention are hydrocarbon mixtures, which may contain non-hydrocarbon material, comprising as an essential ingredient at least one member of the class consisting of unsaturated cyclic hydrocarbons and of naphthenes. For example, the base material may comprise one or a plurality of unsaturated cyclic hydrocarbons of which the following are representative: benzene, toluene, ethyl benzene, xylene, naphthalene, anthracene, cyclopentene, cyclohexene, dihydrobenzene, tetrahydronaphthalene, methyl cyclohexene and the like and their homologues and suitable substitution products.

The invention is preferably executed employing as base materials hydrocarbon mixtures rich in aromatic hydrocarbons and/or naphthenes. The naphthenes are cyclic hydrocarbons which can be monocyclic as well as polycyclic and may contain one or more alkyl groups attached to the cyclic nucleus. The cyclic nucleus or nuclei can contain 4, 5, 6 or more carbon atoms. The simple naphthenes have the empirical formula $C_nH_{2n}$; cyclohexane is a representative member of this class of simple naphthenes; the naphthenes possessing six-membered nuclei may be considered as hydrogenated aromatics.

The source of the base material used is immaterial. Suitable hydrocarbon mixtures may result from the cracking of petroleum, petroleum products, shale oils, vegetable oils, animal oils, etc., by the destructive distillation of coal, petroleum, pitches, waxes, tars, asphalts, and by the destructive distillation of coal and the like carbonaceous materials. The aromatic-containing cracked petroleum distillates and aromatic-containing fractions of such distillates and the extracts thereof, especially those having a boiling temperature equal to or greater than about 150° C., are particularly suitable for our purpose. Excellent results may be obtained by employing as base materials the residues obtained in the distillation of the Edeleanu extracts of aromatic-containing mineral oils (so-called "Resex") and the chlorinated products obtained by chlorination of said residues to varying chlorine contents.

In the practice of the invention, a suitable hydrocarbon fraction containing aromatic hydrocarbons and/or naphthenes is first chlorinated to the desired chlorine content. The chlorination of the hydrocarbon mixture may be performed by passing gaseous or liquid chlorine into the mass of the liquid hydrocarbon mixture until the same has been chlorinated to the desired extent. The extent of chlorination will be dependent upon the particular mixture treated and upon the properties desired in the resulting resinous material. Generally, when the residue of an Edeleanu extract is used as the base material, the chlorination is continued until the increase in weight of the treated mixture shows an absorption of from about 10% to about 60% by weight of chlorine. Excellent results have been obtained with Edeleanu extracts chlorinated to a chlorine content of about 40% to 43% by weight.

If necessary or desirable the chlorination may be effected at elevated temperatures. Suitable chlorinating catalysts or halogen-carriers as metal salts, particularly metal halides, metal cyanides, complex metal cyanides etc., may be used to accelerate the reaction when so desired.

At the conclusion of the operation in which the aromatic- and/or naphthene-containing mixture is chlorinated to the desired extent, the chlorinated mixture is mixed with the desired quantity of a non-chlorinated hydrocarbon mixture containing aromatic hydrocarbons and/or naphthenes, the required amount of a suitable condensation catalyst or agent added, and the reaction effected as hereinafter described.

The chlorinated base material may be reacted with a non-chlorinated portion of the same base material or with any other hydrocarbon mixture containing aromatic hydrocarbons, naphthenes or aromatic hydrocarbons and naphthenes. The relative amounts of the chlorinated and non-chlorinated mixtures reacted are immaterial and will depend upon the particular mixtures reacted, the properties of the resin or resinous material desired, the catalysts used, etc. The non-chlorinated mixture or the chlorinated mixture may predominate or substantially the same amount of each may be used.

As an alternative mode of executing the invention, the base material may be chlorinated to the extent that it contains a relatively small amount of chlorinated material, and the mixture containing chlorinated and unchlorinated material may then be treated with a condensation catalyst under conditions at which the chlorinated material in the mixture reacts with non-chlorinated material to yield a resinous reaction product.

The reaction may be effected in any suitable reaction vessel. A preferably employed reactor comprises a kettle of appropriate size equipped with means for mechanically stirring its contents and means for heating and cooling its contents. The reaction is preferably effected with the reactants in the liquid phase but vapor or liquid vapor phase methods may be used when desired. The chlorinated and non-chlorinated mixtures may be mixed together before, during or after their introduction into the reaction vessel. The reaction may or may not be effected in the presence of an added diluent or selective solvent for the resin or resinous material to be prepared.

The mixture in the reaction vessel is stirred and heated to the desired temperature, preferably in the presence of an activating agent or condensation catalyst, to effect the desired additive polymerization and condensation reactions to yield the desired resinous product.

Condensation catalysts in general are useful in the execution of the invention. Suitable catalysts include among others the acid-acting metal halides, the boron halides, the phosphorus halides, the phosphorus oxy-halides, the mineral acids, the complexes of metal halides with polar inorganic or organic compounds, and the like. A preferred group of catalysts embraces the acid-acting metal and boron halides. Suitable representative catalysts are aluminum chloride, ferric chloride, zinc chloride, boron chloride, stannic chloride, phosphorus oxy-chloride, etc. The catalysts may be used alone or in admixture with each other and/or other materials as carriers, fillers, etc.

The catalyst may be added to the mixture to be reacted in any convenient manner. For example, it may be applied as a solid (powder, granules, pellets, etc.), as a liquid or dissolved or suspended in any suitable medium therefor.

If desired, the catalyst may be added to the reaction mixture all at once but it is preferably added to the agitated reaction mixture continuously or intermittently over a certain period of time until the required amount has been added. In some cases, by a suitable regulation of the rate of admittance of the catalyst, the temperature of the reaction mixture may be more effectively maintained within the desired temperature range.

The amount of catalyst used in each particular case will be dependent upon the particular catalyst, the character and proportions of the materials reacted, the type of resin or resinous material desired, etc.

The process of the invention may be executed at any desired temperature and pressure. In general, good results have been obtained by causing the reaction to take place at elevated temperatures, a preferred temperature range being from about 70° C. to about 120° C. It is to be understood that the successful execution of the invention is not restricted to the use of temperatures in the range specified, since higher or lower temperatures may be advantageously used. Heat may be applied to the reaction vessel to maintain the reaction mixture at the desired temperature until all the catalyst has been added and the reaction has proceeded to completion or to the desired extent. The reaction is accompanied by the evolution of hydrochloric acid; it has usually proceeded to substantial completion when this evolution ceases.

When the reaction to form the valuable resins and resinous materials has proceeded to the desired extent, the reaction mixture can be worked up in any suitable manner for the recovery of the product or products. In the majority of cases, the reaction mixture stratifies into two liquid phases from which the product or products may be recovered as follows: The two liquid layers are separated by any suitable means, as decantation, centrifugation, etc. The lower layer is extracted with a suitable extracting agent, for example an organic solvent for the resinous material, after which the extract obtained is washed, preferably together with the initially separated upper layer of the reaction mixture, with a dilute aqueous acid solution, such as a dilute hydrochloric acid solution and the mixture subsequently washed with water to remove the acid. The mixture may then be subjected to a distillation treatment under atmospheric or reduced pressure to remove the extraction agent used and to concentrate the product to the desired extent. After removal of the extracting agent by distillation, further distillation results in a drying oil product which is obtained as a distillate, the resinous product remaining in the still kettle as residue.

If desired, the part of the initially extracted lower layer of the reaction mixture which is separated from the extraction solution by stratification may be washed with a dilute aqueous acid solution, extracted with a suitable extraction agent, which may be the same agent used in the initial extraction, the extract washed with water and the product recovered therefrom by distillation, preferably together with the initial extract of the lower layer and the separated initial upper layer.

As suitable extraction agents for use in the recovery step of the process, the following may be mentioned: hydrocarbons, as benzol, etc., hydrocarbon fractions as petroleum ether, gasoline, etc., chlorinated hydrocarbons, mixtures of petroleum ether and benzol and the like.

The following examples illustrate suitable modes of executing the process of the invention; it is to be understood that the invention is not to be regarded as limited to the specific materials reacted, the catalyst used or the modes of operation disclosed in the examples.

Example I

The Edeleanu extract of an aromatic hydrocarbon-containing mineral oil was distilled and the residue obtained was chlorinated by passing chlorine into it until the chlorine content of the treated residue was about 40.3%.

About 61.3 grams of the chlorinated residue were mixed with about 32.2 grams of the same non-chlorinated residue and the mixture charged to a reaction vessel equipped with mechanical stirring means and heating and cooling means. The mixture was stirred and heated while powdered aluminum chloride was added at intervals until a total quantity of about 6.0 grams had been added. During the addition of the aluminum chloride and during the subsequent reaction, the temperature of the reaction mixture was maintained at about 80° C. to about 110° C.

After about six hours the reaction, which was accompanied by the evolution of hydrochloric acid, was substantially complete. The reacted mixture was allowed to stratify whereupon two liquid layers separated. The upper layer was separated by decantation and filtered through dry floridine with a view to improving the color of the product.

The lower layer was extracted with a petroleum ether-benzol mixture and the extract solution separated. The separated extract was mixed with the initially separated and filtered upper layer and the mixture washed first with a dilute hydrochloric acid solution, then with water, and distilled.

The residual lower layer, which was separated from the extract solution, was treated with a dilute hydrochloric acid solution and again subjected to an extraction, this time with benzol. The extract solution was separated, washed with water and distilled.

After removal of the extraction agent by evaporation, the product originating from the upper layer yielded about 19.4 grams of a drying oil as distillate and about 18.1 grams of a resinous material as residue, while the product originating from the lower layer yielded about 4.2 grams of drying oil as distillate and about 23.3 grams of resin as residue.

The total yield of the resin was 41.4 grams, while the total yield of the drying oil was 23.6 grams. Both the resin and the drying oil obtained were found to be valuable raw materials in the manufacture of lacquers and varnishes.

Example II

The process was executed in a similar apparatus and in substantially the same manner as described in Example I.

A residue obtained by the distillation of an Edeleanu extract of a mineral oil containing aromatic hydrocarbons was chlorinated to a chlorine content of about 42.4%. About 32.1 grams of this chlorinated residue was reacted with about 90.6 grams of the same non-chlorinated residue in the presence of a condensation catalyst. The reacted mixture was worked up in a manner similar to that described in Example I.

In the working up of the upper layer of the reaction mixture, about 58.1 grams of a drying oil distillate and about 31.6 grams of resin as residue were obtained. The lower layer yielded about 4.1 grams of distillate product and about 10.2 grams of resin as residue, the total yield thus being about 41.8 grams of resin and about 62.2 grams of drying oil.

While I have described my invention in a detailed manner and indicated suitable means of executing the same, it is to be understood that modifications may be made and that no limitations other than those imposed by the scope of the appended claims are intended.

I claim as my invention:

1. A process for the production of a valuable synthetic resinous material which comprises treating a hydrocarbon mixture essentially comprising a substantial amount of at least one member of the class consisting of unsaturated cyclic hydrocarbons and of naphthenes with chlorine until the mixture contains a substantial chlorine content, reacting the chlorinated mixture with a non-chlorinated hydrocarbon mixture essentially comprising a substantial amount of at least one member of the class consisting of unsaturated cyclic hydrocarbons and of naphthenes in the presence of a condensing agent, and separating the resinous reaction product from the reaction mixture.

2. A process for the production of a valuable synthetic resinous material which comprises treating a hydrocarbon mixture essentially comprising substantial amounts of aromatic hydrocarbons and naphthenes with chlorine until the mixture contains a substantial chlorine content, reacting the chlorinated mixture with a non-chlorinated hydrocarbon mixture essentially comprising substantial amounts of aromatic hydrocarbons and naphthenes in the presence of a condensing agent, and separating the resinous reaction product from the reaction mixture.

3. A process for the production of a valuable synthetic resinous material which comprises treating a hydrocarbon mixture essentially comprising a substantial amount of an aromatic hydrocarbon with chlorine until the mixture contains a substantial chlorine content, reacting the chlorinated mixture with a non-chlorinated hydrocarbon mixture essentially comprising a substantial amount of an aromatic hydrocarbon in the presence of a condensing agent, and separating the resinous reaction product from the reaction mixture.

4. A process for the production of a valuable synthetic resinous material which comprises treating a hydrocarbon mixture essentially comprising a substantial amount of a naphthene with chlorine until the mixture contains a substantial chlorine content, reacting the chlorinated mixture with a non-chlorinated hydrocarbon mixture essentially comprising a substantial amount of a naphthene in the presence of a condensing agent, and separating the resinous reaction product from the reaction mixture.

5. A process for the production of a valuable synthetic resinous material which comprises treating a hydrocarbon mixture essentially comprising a substantial amount of at least one member of the class consisting of unsaturated cyclic hydrocarbons and of naphthenes with chlorine until the mixture has a chlorine content of at least about 10% by weight, reacting the chlorinated mixture with a non-chlorinated hydrocarbon mixture essentially comprising a substantial amount of at least one member of the class consisting of unsaturated cyclic hydrocarbons and of naphthenes in the presence of an acid-acting condensing agent, and separating the resinous reaction product from the reaction mixture.

6. A process for the production of a valuable synthetic resinous material which comprises treating a hydrocarbon mixture essentially comprising a substantial amount of at least one member of the class consisting of unsaturated cyclic hydrocarbons and of naphthenes with chlorine until the mixture has a chlorine content of at least about 10% by weight, reacting the chlorinated mixture with a non-chlorinated hydrocarbon mixture essentially comprising a substantial amount of at least one member of the class consisting of unsaturated cyclic hydrocarbons and of naphthenes in the presence of an acid-acting condensing agent at an elevated temperature, and separating the resinous reaction product from the reaction mixture.

7. A process for the production of a valuable synthetic resinous material which comprises treating a hydrocarbon mixture essentially comprising a substantial amount of at least one member of the class consisting of unsaturated cyclic hydrocarbons and of naphthenes with chlorine until the mixture has a chlorine content of at least about 10% by weight, reacting the chlorinated mixture with a non-chlorinated hydrocarbon mixture essentially comprising a substantial amount of at least one member of the class consisting of unsaturated cyclic hydrocarbons and of naphthenes in the presence of an acid-acting condensing agent at a temperature in the range of from about 70° C. to about 120° C., and separating the resinous reaction product from the reaction mixture.

8. A process for the production of a valuable synthetic resinous material which comprises treating a hydrocarbon mixture essentially comprising a substantial amount of an aromatic hydrocarbon with chlorine until the mixture has a chlorine content of at least about 10% by weight, reacting the chlorinated mixture with a portion of the same non-chlorinated base material in the presence of an acid-acting condensation catalyst at an elevated temperature, and separating the resinous reaction product from the reaction mixture.

9. A process for the production of a valuable synthetic resinous material which comprises treating a hydrocarbon mixture rich in aromatic hydrocarbons with chlorine until the treated mixture has a chlorine content of from about 10% to about 60% by weight of chlorine; reacting the chlorinated mixture with a non-chlorinated hydrocarbon mixture rich in aromatic hydrocarbons in the presence of an acid-acting condensation catalyst at a temperature of from about 70° C. to about 120° C., and separating the resinous reaction product from the reaction mixture.

10. A process for the production of a valuable synthetic resinous material which comprises treating a hydrocarbon mixture rich in aromatic hydrocarbons and having a boiling temperature higher than about 150° C. with chlorine until the mixture has a chlorine content greater than about 10% by weight of chlorine, reacting the chlorinated mixture with a non-chlorinated portion of the same base material in the presence of an acid-acting condensation catalyst at an elevated temperature, and separating the resinous reaction product from the reaction mixture.

11. A process for the production of a valuable synthetic resinous material from the residue resulting on distillation of a liquid-sulphur dioxide extract of an aromatic hydrocarbon-containing mineral oil which comprises treating the extract residue with chlorine until it has a chlorine content of at least about 10% by weight of chlorine, reacting the chlorinated material with a non-chlorinated portion of the same base material in the presence of an acid-acting condensation catalyst at an elevated temperature, and separating the resinous reaction product from the reaction mixture.

12. A process for the production of a valuable synthetic resinous material which comprises treating a residue resulting from the distillation of a liquid-sulphur dioxide extract of an aromatic hydrocarbon-containing mineral oil with chlorine until the mixture has a chlorine content of from about 40% to about 43% by weight of chlorine, reacting the chlorinated material with a non-chlorinated portion of the same residue in the presence of aluminum chloride at a temperature of from about 70° C. to about 120° C., and separating the resinous reaction product from the reaction mixture.

13. In a process for the production of a valuable synthetic resinous material from a hydrocarbon mixture essentially comprising an aromatic hydrocarbon, the steps which comprise reacting a partially chlorinated hydrocarbon mixture rich in aromatic hydrocarbons with a non-chlorinated hydrocarbon mixture rich in aromatic hydrocarbons in the presence of an acid-acting condensation catalyst at an elevated temperature, and separating the resinous reaction product from the reaction mixture.

14. The resinous reaction product of a partially chlorinated hydrocarbon mixture essentially comprising at least one member of the class consisting of unsaturated cyclic hydrocarbons and of naphthenes with a non-chlorinated hydrocarbon mixture essentially comprising at least one member of the class consisting of unsaturated cyclic hydrocarbons and of naphthenes in the presence of a condensing agent.

15. The resinous reaction product of a partially chlorinated hydrocarbon mixture essentially comprising at least one aromatic hydrocarbon with a non-chlorinated hydrocarbon mixture essentially comprising at least one aromatic hydrocarbon in the presence of an acid-acting condensing catalyst.

16. The resinous reaction product of a hydrocarbon mixture rich in aromatic hydrocarbons which has been chlorinated to the extent that it contains at least 10% by weight of chlorine with a non-chlorinated portion of the same aromatic hydrocarbon-containing base material in the presence of an acid-acting metal halide at an elevated temperature.

17. A resin derived by reacting a residue resulting from the distillation of a liquid-sulphur dioxide extract of an aromatic hydrocarbon-containing mineral oil which has been chlorinated to the extent that it has a chlorine content of at least 10% by weight of chlorine with an unchlorinated portion of the same extract residue in the presence of an acid-acting metal halide at a temperature of from about 70° C. to about 120° C.

18. A resin derived by treating a partially chlorinated residue resulting from the distillation of a liquid-sulphur dioxide extract of an aromatic hydrocarbon-containing mineral oil with an acid-acting metal halide catalyst at a temperature of from about 70° C. to about 120° C.

HEIN ISRAEL WATERMAN.